United States Patent [19]
Shinozaki et al.

[11] Patent Number: 5,693,683
[45] Date of Patent: Dec. 2, 1997

[54] EXPANDABLE STYRENE RESIN BEADS AND PROCESS FOR PRODUCING THE SAME

[75] Inventors: Hiroki Shinozaki; Masayuki Tanaka; Yonezo Ueda; Takanori Suzuki, all of Mie, Japan

[73] Assignee: Mitsubishi Chemical BASF Company Limited, Yokkaichi, Japan

[21] Appl. No.: 699,823

[22] Filed: Aug. 19, 1996

[30] Foreign Application Priority Data

Sep. 5, 1995 [JP] Japan .................. P.HEI. 7-227954

[51] Int. Cl.$^6$ .................................................. C08J 9/20
[52] U.S. Cl. ..................... 521/56; 521/58; 521/60
[58] Field of Search ........................ 521/56, 58, 60

[56] References Cited

U.S. PATENT DOCUMENTS

| | | |
|---|---|---|
| 3,389,097 | 6/1968 | Ingram et al. . |
| 4,303,783 | 12/1981 | Fava et al. . |
| 5,616,413 | 4/1997 | Shinozaki et al. . |

FOREIGN PATENT DOCUMENTS

| | | |
|---|---|---|
| 247 721 | 7/1988 | Czech Rep. . |
| 268 871 | 8/1990 | Czech Rep. . |
| 0 409 694 | 1/1991 | European Pat. Off. . |
| 2 456 127 | 12/1980 | France . |

OTHER PUBLICATIONS

Database WPI, Derwent Publications, AN–86–071465, JP–A–60–129757, Jul. 11, 1985.
Database WPI, Derwent Publications, AN–92–378215, JP–A–04–279603, Oct. 5, 1992.

*Primary Examiner*—Morton Foelak
*Attorney, Agent, or Firm*—Oblon, Spivak, McClelland, Maier & Neustadt P.C.

[57] ABSTRACT

An expandable styrene resin bead containing voids therein, wherein the number of the voids present in the area from the surface of the bead to a depth of 0.1 mm along the radial direction is not more than 100 per mm$^2$ as counted on a cross section passing through approximately the center of the bead. A process for producing expandable styrene resin beads by suspension polymerization is also disclosed in which a styrene monomer is suspended in an aqueous medium in the presence of an initiator and a suspending agent, and a blowing agent is incorporated into polymer beads produced, wherein an alkali metal salt or ammonium salt of persulfuric acid is added to the reaction system in an amount of 0.5 to 30 ppm based on the aqueous medium while the degree of conversion of said monomer is in the range of from 0 to 30%, and an electrolyte is added to the reaction system in a concentration of 0.02 to 5.0 mol/l based on the aqueous medium when the degree of conversion is 30% or higher. The expandable styrene resin bead does not require aging and, when pre-expanded, show little variation in the state of the cells, i.e., expandable styrene resin beads which hardly undergo influences of storage conditions.

5 Claims, No Drawings ial direction is not more than 100 per mm² as counted on a cross section passing through approximately the center of the bead.

The invention also provides an expandable styrene resin bead containing voids therein, wherein the number of the voids present in the area except the area from the surface of the bead to a depth of 0.3 mm along the radial direction is not less than 250 per mm² as counted on a cross section passing through approximately the center of the bead.

The invention further provides a process for producing expandable styrene resin beads as one of processes for obtaining the above-described expandable styrene resin beads. That is, the invention provides a process for producing expandable styrene resin beads comprising suspending a styrene monomer in an aqueous medium in the presence of an initiator and a suspending agent to obtain polymer beads, and incorporating a blowing agent into the polymer beads, wherein the process further comprises adding an alkali metal or ammonium salt of persulfuric acid to the reaction system in an amount of 0.5 to 30 ppm based on the aqueous medium while the degree of conversion of the monomer is in the range of from 0 to 30% and adding an electrolyte to the reaction system in a concentration of 0.02 to 5.0 mol/l based on the aqueous medium at the point when the degree of conversion of the monomer is greater than 30%.

In the above-described process for producing expandable styrene resin beads, it is preferable that at least one member selected from the group consisting of polyethylene wax, ethylene-bisamide, hexabromocyclododecane, talc, and a methacrylic acid lower alkyl ester copolymer containing not less than 5% by weight of a methacrylic acid lower alkyl ester unit be present in the aqueous medium in a concentration of 0.0001 to 0.95% by weight based on the styrene monomer.

EXPANDABLE STYRENE RESIN BEADS AND PROCESS FOR PRODUCING THE SAME

FIELD OF THE INVENTION

This invention relates to expandable styrene resin beads which do not need aging at a low temperature and, when pre-expanded, show little variation in the state of the cells, i.e., expandable styrene resin beads which hardly undergo influences of storage conditions, and a suspension polymerization process for obtaining the same. More particularly, the present invention relates to expandable styrene resin beads which produce an expansion molded article having markedly excellent outer appearance and excellent mechanical strength and a suspension polymerization process for obtaining the same. The beads obtained by the invention are useful for the production of expansion molded articles, such as fish boxes, returnable cases, heat insulating materials, structural materials (e.g., a drain pan), and cushioning materials for packaging.

BACKGROUND OF THE INVENTION

Expandable styrene resin beads are a socially useful material which is relatively cheap and can be expansion molded with low-pressure steam, etc. without requiring any special technique to provide high cushioning and heat insulation effects.

However, when expandable styrene resin beads are pre-expanded after storage, the resulting pre-expanded styrene resin beads show changes in the state of the cells depending on the conditions of the storage of the expandable styrene resin beads. That is, the pre-expanded beads tend to suffer from cell roughening (a phenomenon that cells become extremely large) or cell unevenness. An expansion molded article obtained from such pre-expanded styrene resin beads tends to have considerably impaired appearance or strength. In order to overcome this problem, use of a special nucleating agent or introduction of a stabilization technique comprising maintaining expandable beads at a low temperature for a long period of time (called aging) has been proposed. However, these methods impose restrictions on various conditions, such as conditions of production, and cannot therefore be an ultimate solution to the problem.

SUMMARY OF THE INVENTION

In order to solve the problem, the inventors of the present invention have conducted extensive study and, as a result, found that an expansion molded article with markedly improved appearance can be obtained by reducing the number of voids in the vicinity of the surface of expandable styrene resin beads (conventional expandable resin beads have about 200 to 500 voids per mm² on average uniformly distributed throughout the individual beads). They have also found that cells of pre-expanded beads can be stabilized by not only reducing the number of voids in the vicinity of the bead surface but slightly increasing the number of voids present in the inside of the individual beads over the number generally observed in conventional expandable resin beads, thereby providing an expansion molded article with excellent appearance, beautiful surface, and sufficient mechanical strength. The present invention has been completed based on these findings.

The invention provides an expandable styrene resin bead containing voids therein, wherein the number of the voids present in the area from the surface of the bead to a depth of 0.1 mm along the rad

DETAILED DESCRIPTION OF THE INVENTION

The expandable styrene resin bead of the present invention contains not more than 100, preferably 0 to 70, voids per mm² in the area from the surface to a depth of 0.1 mm along the radial direction as counted on a cross section passing approximately the center of the individual bead (hereinafter sometimes referred to as a surface area).

If the number of the voids in the surface area is too large, the expandable beads fail to produce an expansion molded article with excellent appearance.

From the standpoint of mechanical strength of the resulting expansion molded article, it is more preferred that the number of the voids present in the area except the area from the surface of the bead to a depth of 0.3 mm along the radial direction is not less than 250 per mm², particularly preferably not less than 350 per mm², especially preferably not less than 500 per mm² and not more than 10000 per mm², as counted on a cross section passing through approximately the center of the bead.

The term "voids" as used herein is intended to denote small holes of about 0.1 to 30 μm in diameter present in the expandable styrene resin beads. The voids may contain in the inside thereof substances other than polystyrene, e.g., water, a blowing agent, a solvent, a plasticizer, a residual monomer, etc.

The number of voids is obtained by preparing a slice passing through about the center of an expandable styrene resin bead with a microtome, taking a micrograph of the slice under a scanning electron microscope, counting the number of the voids on the micrograph, and converting the number into the number per mm². The approximate number of voids can be obtained more easily by observing an expandable styrene resin bead under a transmission optical microscope as soaked in a refractive index adjusting agent having a refractive index of about 1.51 (e.g., ceder wood oil of first grade, a product of Kishida Kagaku K.K.; refractive index=1.514 to 1.522) so as to have its refractive index regulated.

The expandable styrene resin beads of the present invention preferably have a bead size of 0.3 to 3 mm.

Methods for producing the above-described expandable styrene resin beads include a process comprising dispersing a styrene monomer in an aqueous medium in the presence of an initiator and a suspending agent and, after commencing a polymerization reaction, adding an alkali metal salt or ammonium salt of persulfuric acid to the reaction system in an amount of 0.5 to 30 ppm by weight based on the aqueous medium while the degree of conversion of the monomer is in the range of from 0 to 30% by mole, and adding an electrolyte to the reaction system in a concentration of 0.02 to 5.0 mol/l based on the aqueous medium at the point when the degree of conversion of the monomer is greater than 30% by mole to complete suspension polymerization, and adding a blowing agent during the suspension polymerization or impregnating the resulting polymer bead with a blowing agent to obtain expandable styrene resin beads having a bead size of, e.g., 0.3 to 3 mm.

The styrene monomers which can be used in the present invention include styrene, α-methylstyrene, o-methylstyrene, m-methylstyrene, p-methylstyrene, vinyltoluene, p-ethylstyrene, 2,4-dimethylstyrene, p-methoxystyrene, p-phenylstyrene, o-chlorostyrene, m-chlorostyrene, p-chlorostyrene, 2,4-dichlorostyrene, p-n-butylstyrene, p-t-butylstyrene, p-n-hexylstyrene, p-octylstyrene, styrenesulfonic acid, and sodium styrenesulfonate. The styrene monomers may be used in combination with various vinyl monomers, such as alkyl acrylates having 1 to 10 carbon atoms in the alkyl moiety thereof, e.g., methyl acrylate, ethyl acrylate, propyl acrylate, butyl acrylate, and 2-ethylhexyl acrylate; alkyl methacrylates having 1 to 10 carbon atoms, e.g., methyl methacrylate, ethyl methacrylate, propyl methacrylate, butyl methacrylate, and 2-ethylhexyl methacrylate; hydroxyl-containing unsaturated compounds, e.g., hydroxyethyl acrylate, hydroxyethyl methacrylate, hydroxypropyl acrylate, hydroxypropyl methacrylate, hydroxybutyl acrylate, and hydroxybutyl methacrylate; nitrile-containing unsaturated compounds, e.g., acrylonitrile and methacrylonitrile; organic acid vinyl compounds, e.g., vinyl acetate and vinyl propionate; unsaturated monoolefins, e.g., ethylene, propylene, 1-butene, 2-butene, and isobutene; diene compounds, e.g., butadiene, isoprene, and chloroprene; halogenated vinyl compounds, e.g., vinyl chloride, vinylidene chloride, vinyl bromide, and vinyl fluoride; vinyl ketones, e.g., vinyl methyl ketone, vinyl ethyl ketone, and vinyl hexyl ketone; vinyl ethers, e.g., vinyl methyl ether, vinyl ethyl ether, and vinyl isobutyl ether; N-vinyl compounds, e.g., N-vinylpyrrolidone, N-vinylindole, N-vinylcarbazole, and N-vinylpyrrole; amide-containing unsaturated compounds, e.g., acrylamide, methacrylamide, N-methylolacrylamide, and N-methylolmethacrylamide; unsaturated carboxylic acids, e.g., acrylic acid, methacrylic acid, and itaconic acid; maleimide compounds, e.g., N-phenylmaleimide, N-(methyl)phenylmaleimide, N-(hydroxy)phenylmaleimide, N-(methoxy)phenylmaleimide, N-benzoic acid maleimide, N-methylmaleimide, N-ethylmaleimide, N-n-propylmaleimide, N-isopropylmaleimide, N-n-butylmaleimide, N-isobutylmaleimide, and N-t-butylmaleimide; crosslinking polyfunctional vinyl compounds, e.g., divinylbenzene and ethylene glycol dimethacrylate; and epoxy-containing unsaturated compounds, e.g., glycidyl acrylate and glycidyl methacrylate.

The initiator for use in the process of the present invention includes azo compounds, such as azobisisobutyronitrile, and monomer-soluble initiators, such as cumene hydroperoxide, dicumyl peroxide, t-butyl peroxy-2-ethylhexanoate, t-butyl peroxybenzoate, benzoyl peroxide, t-butyl peroxyisopropylcarbonate, t-butyl peroxy-2-ethylhexylmonocarbonate, and lauroyl peroxide. The initiator is usually used in an amount of 0.01 to 3 parts by weight per 100 parts by weight of the total monomers charged.

The suspending agent for use in the process of the present invention includes those commercially available, such as water-soluble polymers, e.g., polyvinyl alcohol, methyl cellulose, and polyvinylpyrrolidone, and slightly soluble inorganic salts, e.g., magnesium pyrophosphate and tricalcium phosphate. These suspending agents may be used in combination with surfactants. In particular, the slightly soluble inorganic salts are preferably used in combination with anionic surfactants, such as sodium alkylsulfonates and sodium dodecylbenzenesulfonate.

The suspending agent is preferably used in an amount of 0.01 to 5.0 parts by weight per 100 parts by weight of the total monomers charged. Where a combination of the slightly soluble inorganic salt and the anionic surfactant is used, the slightly soluble inorganic salt is used in an amount of 0.05 to 3.0 parts by weight, and the anionic surfactant is used in an amount of 0.0001 to 0.5 part by weight, each per 100 parts by weight of the total monomers charged.

The alkali metal or ammonium salt of persulfuric acid for use in the process of the present invention includes potassium persulfate, sodium persulfate, and ammonium persulfate.

It is essential for the alkali metal persulfate or ammonium persulfate to be added to the reaction system while the degree of conversion Of the styrene monomer is in the range of from 0 to 30%, preferably 0 to 20%. If it is added after the polymerization has proceeded over the prescribed range, it is difficult to provide a sufficient amount of voids in the inside of polymer beads. As far as the conversion degree (polymerization rate) falls within the above range, the alkali metal persulfate or ammonium persulfate may be added either all at once or in two or more divided portions. The alkali metal persulfate or ammonium persulfate is added in an amount of 0.5 to 30 ppm by weight, preferably 0.5 to 20 ppm by weight, based on the aqueous medium (all the water content present in the polymerization system; hereinafter the same). If the addition amount is too small, it is difficult to provide a sufficient amount of voids in the inside of polymer beads. If it is too large, the number of the voids in the surface area would be too large, tending to fail to provide an expansion molded article with excellent appearance.

The electrolyte for use in the process of the present invention is other than said alkali metal salt or ammonium salt of persulfuric acid and is otherwise not particularly limited as far as it is dissociated into ions in an aqueous solution. Examples of suitable electrolytes include inorganic salts, such as lithium chloride, sodium chloride, magnesium chloride, potassium chloride, calcium chloride, ammonium chloride, sodium sulfate, magnesium sulfate, potassium sulfate, aluminum sulfate, ammonium sulfate, sodium nitrate, magnesium nitrate, potassium nitrate, calcium nitrate, sodium carbonate, magnesium carbonate, potassium carbonate, calcium carbonate, and ammonium carbonate; and water-soluble alkali metal salts of carboxylic acids, such as potassium acetate, sodium acetate, sodium octanoate, sodium benzoate, and disodium succinate. Sodium chloride is particularly preferred. By addition of a small amount of sodium chloride, expandable styrene resin beads having a small number of voids in the surface area thereof which are capable of becoming an expansion initiating sites can be obtained with ease. Sodium chloride is also advantageous for its industrial availability at low cost and in quantity.

It is essential for the electrolyte to be added when the degree of conversion is greater than 30%. If the electrolyte is added when the degree of conversion is lower than 30%, the above-specified void distribution of the present invention cannot be obtained; the resulting expandable resin beads tend to become coarse beads or undergo deformation; and under some conditions the suspension state under polymerization tends to become instable and form masses. The electrolyte is preferably added when the degree of conversion is 50 to 100%, more preferably 75 to 100%.

The electrolyte is added in the form of powder or an aqueous solution. As far as the degree of conversion falls within the above range, the electrolyte may be added either all at once or in several divided portions. For the purpose of pH adjustment of the aqueous medium, a small amount of the electrolyte may also be added before the degree of conversion reaches 30% provided that the suspension state does not become instable and the objects of the present invention are not impaired.

The degree of conversion can be determined by a specific gravity method, infrared absorption analysis, gas chromatography, and the like.

The amount of the electrolyte to be added after the degree of conversion reaches 30% is 0.02 to 5.0 mol/l, preferably 0.03 to 1.0 mol/l, based on the aqueous medium. If the amount is too small, the number of the voids in the surface area increases, and the resulting expansion molded article has poor appearance. If the amount is too large, it is difficult to conduct polymerization stably so that the suspension tends to form masses, and no further effect corresponding with the increase in amount results.

According to the process of the present invention, a blowing agent is added during the suspension polymerization or after completion of the suspension polymerization to incorporate the same into the polymer beads to provide expandable polymer beads.

Examples of suitable blowing agents include physical blowing agents, such as aliphatic hydrocarbons, e.g., propane, n-butane, isobutane, n-pentane, isopentane, neopentane, and hexane, alicyclic hydrocarbons, e.g., cyclobutane and cyclopentane, and halogenated hydrocarbons, e.g., methyl chloride and dichlorofluoromethane; and inorganic gases, such as carbon dioxide, nitrogen, and ammonia. These blowing agents may be used either individually or as a combination of two or more thereof. The blowing agent is usually added in such an amount to give a blowing agent content of 1 to 20% by weight in the resulting polymer beads.

In order to increase the inside voids in number, it is preferable that at least one member selected from the group consisting of polyethylene wax, ethylene-bisamide, hexabromocyclododecane, talc, and a methacrylic acid lower alkyl ester copolymer containing not less than 5% by weight of a methacrylic acid lower alkyl ester unit be present in the aqueous medium in a concentration of 0.0001 to 0.95% by weight based on the styrene monomers.

If desired, a chain transfer agent, such as an alkylmercaptane (e.g., dodecylmercaptane) and an α-methylstyrene dimer, can be added to the polymerization system for the purpose of molecular weight control. The chain transfer agent is preferably added in an amount of 0.01 to 3 parts by weight per 100 parts by weight of the total monomers.

The monomers may be added to the aqueous medium either all at once or gradually with the progress of the polymerization (refer to JP-B-46-2987 and JP-B-49-2994, the term "JP-B" as used herein means an "examined published Japanese patent application").

If desired, a plasticizer for the polymer produced, such as phthalic esters (e.g., dioctyl phthalate) or organic compounds, such as fatty acid esters, xylene, toluene, and cyclohexane, may be added to the polymerization system.

It is also possible to add to the polymerization system additives generally used in the production of expandable resin beads, such as flame retardants, flame retardation synergists, antistatic agents, conductivity-imparting agents, bead size distribution regulators, and the like, as appropriate, or to mix a rubber component, such as butadiene rubber or styrene-butadiene rubber.

EXAMPLES

The present invention will be illustrated in greater detail with reference to Examples and Comparative Examples, but it should be understood that the invention is not deemed to be limited thereto.

Example 1

In a 50 l autoclave equipped with a stirrer were put 20 l of ion-exchanged water, 50 g of tricalcium phosphate (a product of Taihei Chemical Industrial Co., Ltd.), and 0.6 g of sodium dodecylbenzenesulfonate. To the mixture was added while stirring 18 kg of styrene monomer having dissolved therein 45 g of t-butyl peroxy-2-ethylhexanoate, 27 g of t-butyl peroxy-2-ethylhexylmonocarbonate, and 270 g of cyclohexane (plasticizer).

After purging the autoclave with nitrogen, the mixture was stirred at room temperature for 30 minutes and then heated up to 90° C. over a period of 1.5 hours. When the inner temperature reached 60° C., 12 g of a 1% aqueous solution of potassium persulfate was added. The reaction mixture was further heated from 90° C. to 100° C. over a period of 5.5 hours. When a 4.5 hour period had passed since the start of heating from 90° C., an aliquot of the suspension was analyzed to find that the degree of conversion was 75%. At this point, 700 g of a 25% aqueous solution of sodium chloride (corresponding to 0.15 mol/l based on the aqueous medium) was added to the reaction mixture over a 5 minute period, and subsequently 1.7 kg of butane was pressed into the autoclave. The reaction temperature was further elevated from 100° C. to 110° C. over a period of 1.5 hours, at which temperature the reaction system was maintained for 2 hours.

After cooling to 30° C. over a 4 hour period, the reaction mixture was washed with an acid to remove tricalcium phosphate adhered to the surface of the expandable resin beads produced. The reaction mixture was dehydrated by means of a centrifugal separator, and the water adhered to the surface of the beads was removed in a fluidized bed drier to obtain expandable resin beads. The beads were sieved to collect beads having a bead size of 0.8 to 1.2 mm, and 0.1% of zinc stearate was adhered to the surface of the beads as an antiblocking agent. The resulting expandable resin beads were pre-expanded in a pre-expander (DYH-850, manufactured by Daisen Industry Co., Ltd.) in a usual manner to a bulk density of 20 g/l.

After the resulting pre-expanded beads were allowed to stand (aged) at room temperature for one day, they were charged in a box type mold of 28×35×15 cm and heated by blowing steam under a pressure of 0.6 kgf/cm² for 20 seconds to obtain an expansion molded article.

The number of voids in the above-obtained expandable resin beads, the cell stability in pre-expansion of the expandable resin beads, and the outer appearance and falling ball impact strength of the expansion molded article were determined according to the following methods of evaluation.

Methods of Evaluation:

1) Number of Voids

The expandable styrene resin bead was sliced with a microtome at a position passing approximately the center thereof, and the cut area of the slice was observed under a scanning electron microscope and photographed. The number of voids in a 0.1 mm×0.3 mm area in the surface area and the number of voids in a 0.2 mm×0.2 mm area in the inside area were counted on the photograph, and the respective numbers of the voids per mm² were obtained.

2) Cell Condition of Pre-expanded Beads

The expandable styrene resin beads were pre-expanded and expansion molded in the same manner as described above (1) immediately after they were taken out of the autoclave and the water adhered to the surface was removed, or (2) after the beads, which had been taken out of the autoclave, and from which water adhered to the surface had been removed, were preserved at 0° C. for 7 days, or (3) after the beads, which had been taken out of the autoclave, and from which water adhered to the surface had been removed, were preserved at 40° C. for 3 days. The cell condition was observed visually and evaluated according to the following standard.

Standard of Evaluation:

Good . . . Neither cell roughening nor cell unevenness was observed.

Poor . . . Cell roughening or cell unevenness was observed.

3) Appearance

The appearance of the expansion molded article was observed visually and evaluated according to the following standard.

Standard of Evaluation:

Good . . . Satisfactory appearance free from cell roughening, cell unevenness and gaps among beads.

Poor . . . Poor appearance due to cell toughening, cell unevenness and gaps among beads.

4) Falling Ball Impact Test

A steel ball weighing 255 g was dropped on the expansion molded article, and the height of the falling ball at which 50% of the articles were broken was measured (according to JIS K7211).

Example 2

The same procedure as in Example 1 was performed, except that 0.5 g (corresponding to 0.0028% based on the styrene monomer) of a methyl methacrylate polymer (BR-80, produced by Mitsubishi Rayon Co., Ltd.) was added to the styrene monomer in addition to the initiator and the plasticizer, and 5.4 g of a 1% aqueous solution of potassium persulfate was added to the reaction mixture when the inner temperature reached 60° C. The same evaluation as in Example 1 was made.

Example 3

The same procedure as in Example 2 was performed, except that the amounts of the methyl methacrylate polymer (BR-80, produced by Mitsubishi Rayon Co., Ltd.) and the 1% aqueous solution of potassium persulfate were changed to 1.8 g (corresponding to 0.01% based on the styrene monomer) and 18 g, respectively, and 700 g (corresponding to 0.15 mol/l based on the aqueous medium) of a 25% aqueous solution of sodium chloride was added to the reaction mixture when cooling was started (the degree of conversion at this point was found to be 99%) over a period of 10 minutes. The same evaluation as in Example 1 was made.

Example 4

The same procedure as in Example 1 was performed, except that the amount of the 1% aqueous solution of potassium persulfate was changed to 9 g, 1450 g (corresponding to 0.1 mol/l based on the aqueous medium) of a 20% aqueous solution of sodium acetate was added to the reaction mixture over a 10 minute period when 4 hours had passed from the start of heating from 90° C. (the degree of conversion at this point was found to be 60%), and the cooling to 30° C. after completion of the polymerization was carried out over a period of 6 hours. The same evaluation as in Example 1 was made.

Example 5

The same procedure as in Example 2 was performed, except that the methyl methacrylate polymer was replaced with 100 g (corresponding to 0.60% based on the styrene monomer) of hexabromocyclododecane (HBCD-LMS, produced by DEAD SEA BROMO Co., Ltd.), the amount of the 25% aqueous solution of sodium chloride was changed to 500 g (corresponding to 0.11 mol/l based on the aqueous medium), and the cooling to 30° C. after completion of the polymerization was carried out over a period of 3 hours. The same evaluation as in Example 1 was made.

Example 6

The same procedure as in Example 4 was performed, except that the 1% aqueous solution of potassium persulfate was added when 1 hour had passed from the start of heating from 90° C. (the degree of conversion at this point was found to be 25%). The same evaluation as in Example 1 was made.

Example 7

The same procedure as in Example 4 was performed, except that the 25% aqueous solution of sodium chloride was added when 2.5 hours had passed from the start of heating from 90° C. (the degree of conversion at this point was found to be 40%). The same evaluation as in Example 1 was made.

Comparative Example 1

The same procedure as in Example 2 was performed, except that the 25% aqueous solution of sodium chloride was not added. The same evaluation as in Example 1 was made.

Comparative Example 2

The same procedure as in Example 2 was performed, except that no persulfate was added. The same evaluation as in Example 1 was made.

Comparative Example 3

The same procedure as in Example 2 was performed, except that the amount of the methyl methacrylate polymer (BR-80, produced by Mitsubishi Rayon Co., Ltd.) was changed to 0.2 g (corresponding to 0.0011% based on the styrene monomer), 7 kg (corresponding to 6 mol/l based on the aqueous medium) of sodium chloride was added over a 10 minute period when 4 hours had passed from the start of heating from 90° C. (the degree of conversion at this point was 60%), and the cooling to 30° C. after completion of the polymerization was carried out over a period of 8 hours. The same evaluation as in Example 1 was made.

Comparative Example 4

The same procedure as in Example 5 was performed, except that neither a persulfate nor sodium chloride aqueous solution was added. The same evaluation as in Example 1 was made.

Comparative Example 5

The same procedure as in Example 1 was performed, except for changing the amount of the 1% aqueous solution of potassium persulfate to 63 g. The same evaluation as in Example 1 was made.

Comparative Example 6

The same procedure as in Example 3 was performed, except that 700 g (corresponding to 0.15 mol/l based on the aqueous medium) of a 25% aqueous solution of sodium chloride was added at the point when the inner temperature reached 90° C. (the degree of conversion at this point was 10%). The same evaluation as in Example 1 was made.

Comparative Example 7

The same procedure as in Example 1 was performed, except that 700 g (corresponding to 0.15 mol/l based on the aqueous medium) of a 25% aqueous solution of sodium chloride was added when 4 hours had passed from the start of heating from 90° C. and 18 g of a 1% aqueous solution of potassium persulfate was added 30 minutes after the addition of the sodium chloride solution. The same evaluation as in Example 1 was made.

TABLE 1

| | Conditions of Production | | | | | | Results of Evaluation | | | | | | |
|---|---|---|---|---|---|---|---|---|---|---|---|---|---|
| | Persulfate | | | Electrolyte | | | | | Cell Condition | | | | |
| | | | Conversion Degree at | | | Conversion Degree at | Void Number (/mm$^2$) | | Immediately-After | | | | Height of Falling |
| Example No. | Kind | Amount (ppm) | Addition (%) | Kind | Amount (mol/l) | Addition (%) | Surface Area | Inside | Preparation | 0° C. × 7 Days | 40° C. × 3 Days | Appearance | Ball (cm) |
| 1 | potassium persulfate | 7 | 5 | sodium chloride | 0.15 | 75 | 0 | 400 | good | good | good | good | 36 |
| 2 | potassium persulfate | 3 | 5 | sodium chloride | 0.15 | 75 | 33 | 500 | good | good | good | good | 40 |
| 3 | potassium persulfate | 10 | 5 | sodium chloride | 0.15 | 99 | 67 | 1000 | good | good | good | good | 42 |
| 4 | potassium persulfate | 5 | 5 | sodium acetate | 0.10 | 60 | 0 | 350 | good | good | good | good | 38 |
| 5 | potassium persulfate | 3 | 5 | sodium chloride | 0.11 | 75 | 100 | 1500 | good | good | good | good | 43 |
| 6 | potassium persulfate | 5 | 25 | sodium acetate | 0.10 | 60 | 0 | 300 | good | good | good | good | 37 |
| 7 | potassium persulfate | 5 | 5 | sodium acetate | 0.10 | 40 | 0 | 325 | good | good | good | good | 37 |

TABLE 2

| | Conditions of Production | | | | | | Results of Evaluation | | | | | | |
|---|---|---|---|---|---|---|---|---|---|---|---|---|---|
| | Persulfate | | | Electrolyte | | | | | Cell Condition | | | | |
| | | | Conversion Degree at | | | Conversion Degree at | Void Number (/mm$^2$) | | Immediately-After | | | | Height of Falling |
| Example No. | Kind | Amount (ppm) | Addition (%) | Kind | Amount (mol/l) | Addition (%) | Surface Area | Inside | Preparation | 0° C. × 7 Days | 40° C. × 3 Days | Appearance | Ball (cm) |
| 1 | potassium persulfate | 3 | 5 | — | — | — | 230 | 500 | good | good | good | poor | 37 |
| 2 | — | — | — | sodium chloride | 0.15 | 75 | 33 | 200 | good | good | good | good | 32 |
| 3 | potassium persulfate | 3 | 5 | sodium chloride | 6.0 | 60 | 0 | 100 | good | good | good | poor | 24 |
| 4 | — | — | — | — | — | — | 1170 | 1500 | poor | good | poor | poor | 40 |
| 5 | potassium persulfate | 35 | 5 | sodium chloride | 0.15 | 75 | The reaction mixture formed masses. | | | | | | |
| 6 | potassium persulfate | 10 | 5 | sodium chloride | 0.15 | 10 | The reaction mixture formed masses. | | | | | | |
| 7 | potassium persulfate | 10 | 75 | sodium chloride | 0.15 | 60 | 167 | 350 | good | good | good | poor | 35 |

The expandable styrene resin beads of the present invention do not need to be maintained at a low temperature for a long period of time, i.e., does not need aging at a low temperature. The cells of the pre-expanded beads obtained from the expandable styrene resin beads are in excellent condition regardless of the storage conditions of the expandable styrene resin beads. The expansion molded article prepared from the expandable resin beads of the invention has beautiful appearance and sufficient mechanical strength.

What is claimed is:

1. An expandable styrene resin bead containing voids therein, wherein the number of the voids present in the area from the surface of the bead to a depth of 0.1 mm along the radial direction is not more than 100 per mm$^2$ as counted on a cross section passing through approximately the center of the bead.

2. An expandable styrene resin bead according to claim 1, wherein the number of the voids present on the area except the area from the surface of the bead to a depth of 0.3 mm along the radial direction is not less than 250 per mm$^2$ as counted on a cross section passing through approximately the center of the bead.

3. An expandable styrene resin bead according to claim 1, wherein said expandable styrene resin bead has a bead size of 0.3 to 3 mm.

4. A process for producing expandable styrene resin beads by suspension polymerization, which comprises:

suspending a styrene monomer in an aqueous medium in the presence of an initiator and a suspending agent to thereby obtain styrene resin beads; and incorporating a blowing agent into said styrene resin beads, wherein an alkali metal salt or ammonium salt of persulfuric acid is added to the reaction system in an mount of 0.5 to 30 ppm by weight based on the aqueous medium while the degree of conversion of said monomer is in the range of from 0 to 30% by mole, and an electrolyte other than said alkali metal salt or ammonium salt of persulfuric acid is added to the reaction system in a concentration of 0.02 to 5.0 mol/l based on the aqueous medium when the degree of said conversion of said monomer is greater than 30% by mole.

5. A process according to claim 4, wherein at least one member selected from the group consisting of polyethylene wax, ethylene-bisamide, hexabromocyclododecane, talc, and a methacrylic acid lower alkyl ester copolymer containing not less than 5% by weight of a methacrylic acid lower alkyl ester unit is present in the aqueous medium in a concentration of 0.0001 to 0.95% by weight based on said styrene monomers.

* * * * *